United States Patent [19]
Rowe

[11] Patent Number: 5,214,281
[45] Date of Patent: May 25, 1993

[54] METHOD FOR LOCATING SUB-TERRANEAN GEOLOGICAL AGGREGATE DEPOSITS

[76] Inventor: Douglas J. Rowe, Box 37, Site 23, R.R. #12, Calgary, Alberta T3E 6W3, Canada

[21] Appl. No.: 855,393

[22] Filed: Mar. 20, 1992

[51] Int. Cl.⁵ ............................................. G01V 5/02
[52] U.S. Cl. .................................... 250/253; 250/255
[58] Field of Search ........................ 250/253, 255, 256

[56] References Cited

U.S. PATENT DOCUMENTS

| | | | |
|---|---|---|---|
| 3,825,751 | 7/1974 | Johnson, Jr. et al. | 250/253 |
| 3,919,597 | 11/1975 | Foote | 250/253 |
| 4,581,531 | 4/1986 | Dion | 250/253 |

Primary Examiner—Carolyn E. Fields
Assistant Examiner—Drew A. Dunn
Attorney, Agent, or Firm—Bereskin & Parr

[57] ABSTRACT

This invention relates to the field of prospecting to locate mineral deposits particularly gravel and clay deposits. The method of prospecting to locate these mineral deposits includes the steps of traversing an area of the earth's surface and obtaining measurements of gamma radiation corresponding to the presence of uranium, potassium and thorium at spaced points along the traverse. The data collected are used to determine an area mean value for the gamma radiation measurements obtained. The mineral location is obtained by noting areas within the area traversed in which the variations of the measurements of gamma radiation corresponding to each of uranium, potassium and thorium relating to the respective area mean values are indicative of the particular mineral being located. It has been found that aggregates may be located by looking for areas in which the gamma radiation corresponding to uranium is approximately equal to the area mean value while the measurements corresponding to potassium are low relative to the area mean and the measurements corresponding to thorium are low relative to the area mean. Clay may be located by noting areas in which the measurements corresponding to uranium are relatively high compared to the area mean value, the measurements corresponding to potassium are high relative to the area mean and the measurements of thorium are high relative to the area mean respectively.

6 Claims, 9 Drawing Sheets

METHOD FOR LOCATING SUB-TERRANEAN GEOLOGICAL AGGREGATE DEPOSITS

FIELD OF THE INVENTION

The present invention relates to mineral locating techniques. More particularly, it relates to gamma ray spectrometry method for identifying geological aggregate deposits and the minerals (metallic, nonmetallic and precious) that can be found in such deposites.

BACKGROUND OF THE INVENTION

Geological aggregate deposits, or simply aggregates, are naturally occurring materials, considered in bulk as mixtures of particles of varying sizes. Aggregates can include materials such as boulders, cobbles, gravel, sand, silt and other granular materials having little or no plasticity. Aggregates, are commonly used to manufacture concrete and to construct roads, railroads and drainage works.

Aggregate deposits may be partially or wholly exposed at the land surface. Frequently however, they are found under layers of overburden. Proximity to point-of-use, i.e. the construction site, is often a prime factor in exploiting an aggregate deposit. Another factor in exploiting an aggregate deposit is the economic cost of removing the overburden. The economics of removing the overburden is a function of the value of the aggregate to be exposed and may depend on whether the aggregate deposit contains other minerals. These minerals may be metallic, non-metallic and/or precious minerals, depending on the geological origin of the aggregate deposit.

Over the years, various techniques have been developed for aggregate deposit prospecting. There are two principal techniques currently in use. The first technique relies on local knowledge of deposits which has been revealed by events such as surface exposure, road cuts, water wells and surface excavation. The other technique encompasses surficial geological investigations including the interpretation of aerial photographs. Surficial geological investigations involve identifying areas which have a high potential for containing aggregates based on the surface expression of geological phenomena that could have created the deposits (e.g. glacial processes). Potential sites for aggregates are then tested using on-site evaluation methods, including visual examination and electromagnetic surveys; and sub-surface methods such as drilling or excavation. The purpose of the on-site evaluation is to confirm and delineate the deposit, while also estimating the quality and composition of the material in the deposit, in addition to determining overburden thickness, depth to water table etc.

The known methods of aggregate exploration have enjoyed variable success in predicting aggregate deposit sites. Aerial photograph interpretation relies heavily on the surface expression of sub-terranean aggregate deposits or related geological events. As a result, its effectiveness is limited where the surface expression of the buried aggregate deposit is masked by subsequent deposits, erosion, plant growth or agricultural disturbances. Other remote sensing techniques, such as airborne electromagnetic and potential field sensing and satellite imaging, have been applied, but with limited success in locating commercially viable aggregate deposits.

It is estimated by the prospecting community that the success rate for aggregate prospecting is less than 5% using the above conventional methods. In other words, on average, less than 5% of the aggregate deposits identified using conventional techniques have yielded commercially viable sites.

According to the present invention, it has been found that aggregate deposits at or near the earth's surface are associated with a unique radioelement signature.

This radioelement signature, generally unique to aggregate deposits, can be detected using Gamma Ray Spectrometry (GRS) methods. Gamma Ray Spectrometry involves measuring sub-surface, near-surface and surface emanations of naturally occurring gamma radiation. For years, GRS has been used as an aid in prospecting for certain mineral deposits. Initial applications of GRS included detecting high magnitude anomalies in the naturally occurring gamma radiation caused by outcrops and other features containing enrichments of uranium and thorium minerals. More recently, GRS techniques have been applied to locating sub-terranean petroleum-bearing deposits as disclosed by Foote in U.S. Pat. No. 3,919,547.

In summary, it is an object of the present invention to provide a reliable method, incorporating GRS methods, for identifying and locating aggregate deposits and clay-rich soils at or near the earth's surface. The method, according to the present invention, achieves an improvement in the likelihood of success over known methods (which are successful only approximately 1 out of 20 times) for locating commercial deposits. It will be appreciated that the method according to the present invention can provide a breakthrough for aggregate deposit prospecting.

SUMMARY OF THE INVENTION

According to a first aspect of the present invention, there is provided a method for locating a mineral deposit situated on or below the surface of the earth, comprising the steps of: (a) traversing an area of the earth's surface; (b) obtaining measurements of gamma radiation corresponding to the presence of uranium at spaced points along the traverse; (c) obtaining measurements of gamma radiation corresponding to the presence of potassium at spaced points along the traverse; (d) obtaining measurements of gamma radiation corresponding to the presence of thorium at spaced points along the traverse; (e) determining individual area mean values for the gamma radiation measurements obtained for the area traversed for each of uranium, potassium, and thorium; and (f) noting locations in the area traversed in which variations of the measurements of gamma radiation corresponding to each of uranium, potassium and thorium relative to their respective area mean values are indicative of the particular mineral being located.

In a second aspect of the present invention, there is provided a method for locating a sub-terranean or surface deposit of geological aggregate matter, comprising the steps of identifying any locations in the area traversed in which: (a) the measurements of gamma radiation corresponding to uranium are approximately equal to the area mean value determined for uranium; (b) the measurements of gamma radiation corresponding to potassium are low relative to the area mean value determined for potassium; and (c) the measurements of gamma radiation corresponding to thorium are low relative to the area mean value determined for thorium.

In a third aspect of the present invention, there is provided a method for locating a surface or subterranean deposit of clay, comprising the steps of, identifying any locations in the area traversed in which: (a) the measurements of gamma radiation corresponding to uranium are high relative to the area mean value determined for uranium; (b) the measurements of gamma radiation corresponding to potassium are high relative to the area mean value determined for potassium; and (c) the measurements of gamma radiation corresponding to thorium are high relative to the area mean value determined for thorium.

BRIEF DESCRIPTION OF THE DRAWINGS

For a better understanding of the present invention, and to show more clearly how it may be carried into effect, reference will now be made, by way of example to a preferred embodiment of the present invention, shown in the accompanying drawings, in which:

FIG. 7(a) to 7(i) shows typical graphs generated from the gamma ray spectrometry data gathered from the survey area;

DETAILED DESCRIPTION OF THE PREFERRED EMBODIMENT

To detect surface and sub-terranean mineral deposits having unique radioelement signatures, the present invention utilizes Gamma Ray Spectrometry (GRS) techniques. According to the present invention, gamma ray data, acquired using GRS techniques, are processed and compiled to produce an aggregate potential map. The aggregate potential map shows sites in the area surveyed where there is a high probability of locating aggregate deposits.

Gamma Ray Spectrometry (GRS), as is known, measures sub-surface, near-surface and surface emanations of naturally occurring gamma radiation. In recent years, improvements in measurement equipment, data processing capabilities, and analytic techniques have made it possible to reliably separate and examine the relative abundance of three naturally occurring radioactive series: uranium, thorium, and potassium. When radioelements in these series decay, they produce gamma radiation, some of which can be detected below, on or above the surface of the area being surveyed. Scintillation detectors are commonly used to detect the gamma radiation emitted by these radioelements.

According to the present invention, aggregate deposits at or near the earth's surface are identified by a unique radioelement signature derived from the data gathered by gamma ray spectrometry equipment and other sensing instruments as will be explained below. This unique signature associated with aggregate deposits comprises a definable relationship, in which the relative abundance of the radioactive nuclides occurring over the aggregate deposit are significantly different from the relative abundance of radioactive nuclides adjacent to the deposit. According to the present invention, the signature most commonly associated with aggregate deposits is a coincident low value of radioelement ground concentrations of equivalent thorium and potassium.

According to another aspect of the present invention, a unique radioelement signature can be derived for clay-rich soil types. Using the method of the present invention, this signature can be derived and used to identify clay-rich soil type areas, in the same manner as described for aggregate deposit prospecting. As will be explained, the signature of clay-rich deposits is a relatively low level, (under 2 ppm) equivalent uranium measurement, which is at least 25% higher than the area mean value, a potassium measurement value at least 25% higher than the area mean value for potassium, and an equivalent thorium measurement value at least 25% higher than the area mean value for equivalent thorium.

Figure 1:
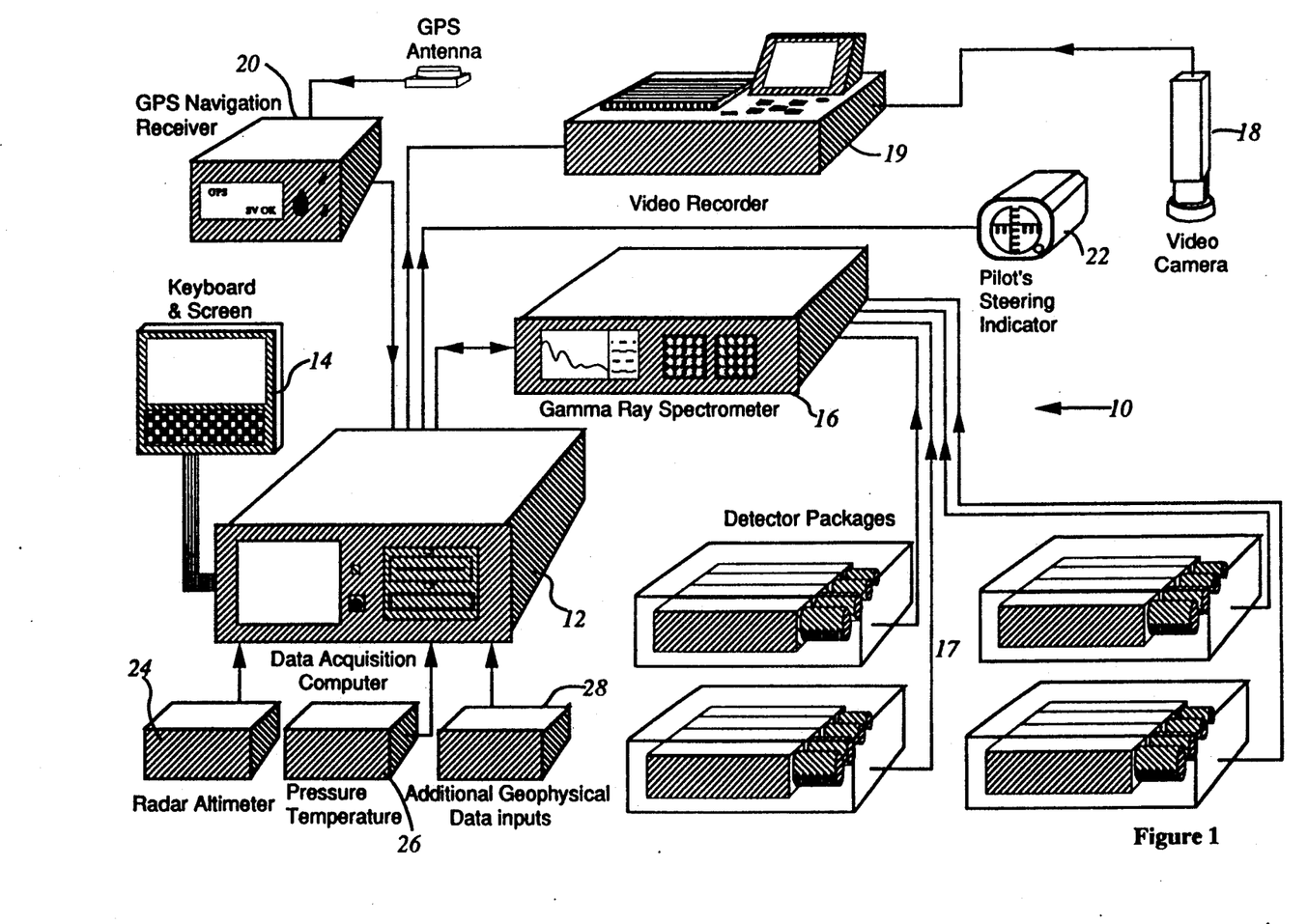
FIG. 1 pictorially shows the components of a system for practising the method according to the present invention.

Reference is now made to FIG. 1. FIG. 1 shows apparatus, indicated by reference 10, suitable for practising the method of identifying sub-terranean and surface deposits according to the present invention. The principal function of the apparatus 10 is to gather and process two types of data. The first type of data is gamma ray spectrometry data which corresponds to the geological characteristics of the deposits being prospected. The second type of data is correlation data which is used to correlate and verify the gamma ray spectrometry data.

As shown in FIG. 1, the apparatus 10 comprises a data acquisition computer 12 which includes a keyboard and screen 14. The computer 12 under the control of a software program (not shown) controls and receives data from various data gathering and electronic devices. The data gathering devices include a gamma ray spectrometer 16 and a number of gamma ray detectors 17, a video camera 18 connected to a video recorder 19, and a GPS navigation receiver and antenna 20. The data acquisition computer 12 can also receive or control data to or from airborne support instruments. The airborne support instrumentation includes a pilot steering indicator 22, a radar altimeter 24, and a barometric pressure and air temperature sensor 26. The functions of the support instrumentation are to provide pilot steering information as well as positional and environmental data, which will be used to correlate and process the radiometric data gathered by the gamma ray spectrometer 16. The apparatus 10 can also include complementary geophysical equipment indicated by 28 to provide additional measurements. The equipment 28 can include electromagnetic, magnetometer, SAR radar and other known remote sensing devices (not shown).

Typically, GRS surveys are conducted using a measurement platform that is moving relative to the earth's surface. Established prospecting techniques include transporting the GRS measurement equipment on surface, airborne or underwater platforms that traverse the region under investigation in an orderly fashion. In the preferred embodiment of the present invention, an aeroplane is used as the measurement platform.

Figure 2:
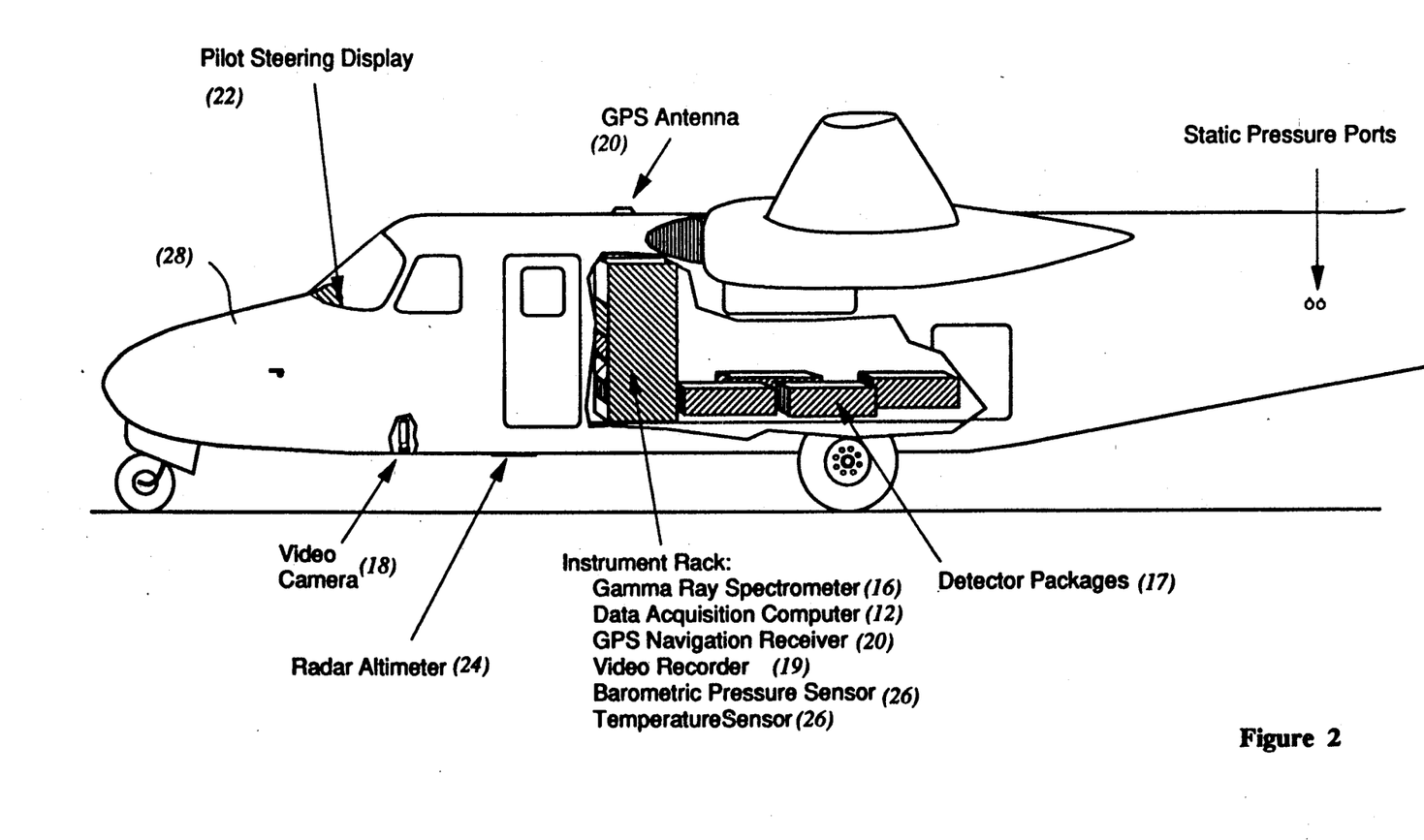
FIG. 2 pictorially shows the system mounted in an aeroplane for conducting an aerial survey.

Referring to FIG. 2, the apparatus 10 is mounted on an instrument rack in an aeroplane 28 or attached to the aeroplane 28. The aeroplane 28 used to fly a GRS survey is usually a light twin-engine aircraft manned by a pilot and an assistant for operating the apparatus 10.

Figure 3:
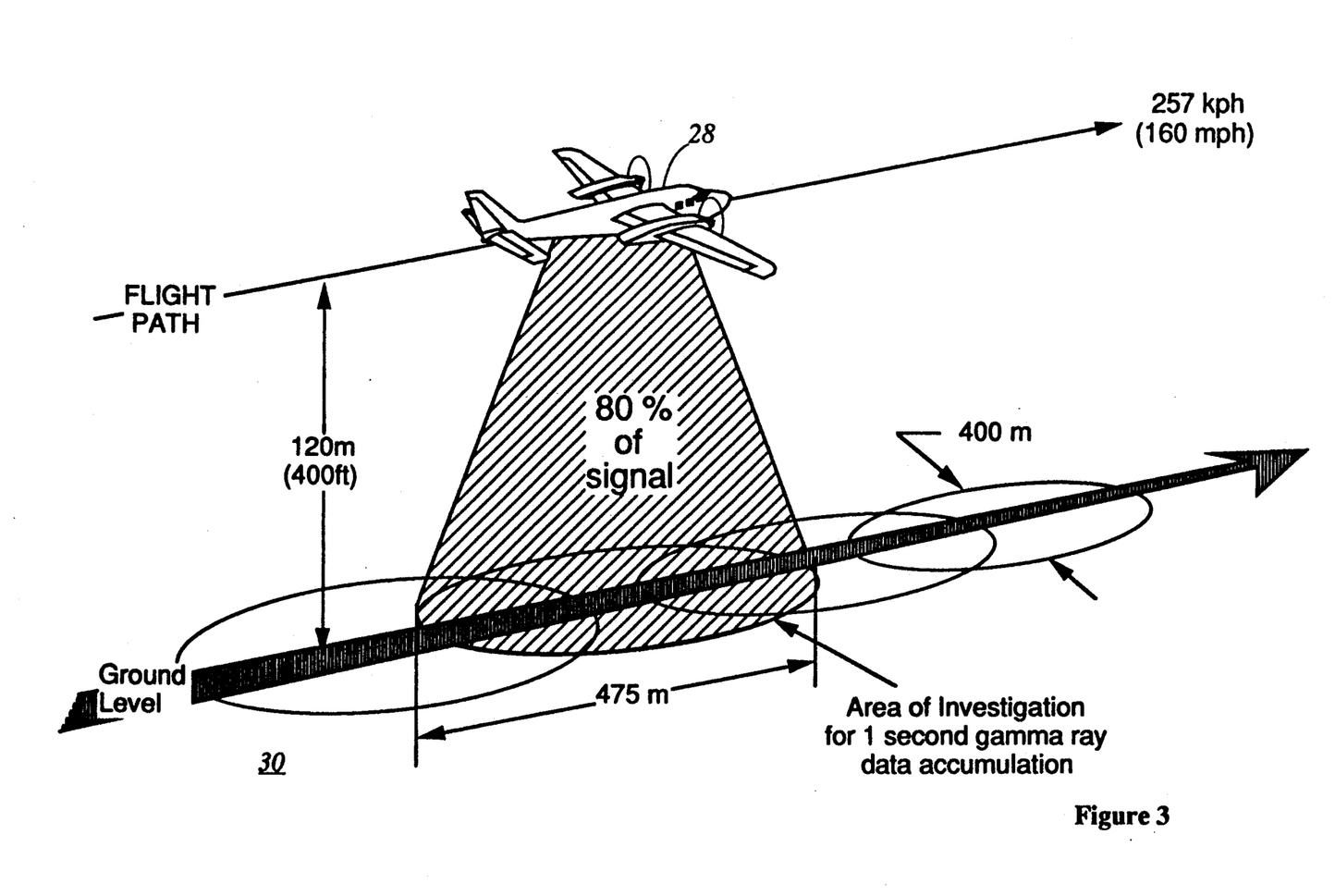
FIG. 3 pictorially shows the aeroplane gathering data from the survey area.

As depicted in FIG. 3, in a typical data gathering operation, the aeroplane 28 flies over a survey area 30 at a speed of 160 mph (257 kph) at a nominal altitude of 400 feet (120 meters) above ground level, and traverses the survey area 30 at regular intervals with remote sensing data (gamma ray spectrometer 16 and detectors 17), position data (i.e. navigation receiver 20, video camera 18, and radar altimeter 24) and environmental data (i.e. barometric pressure and temperature 26) being taken and recorded generally at one second intervals.

Figure 4:
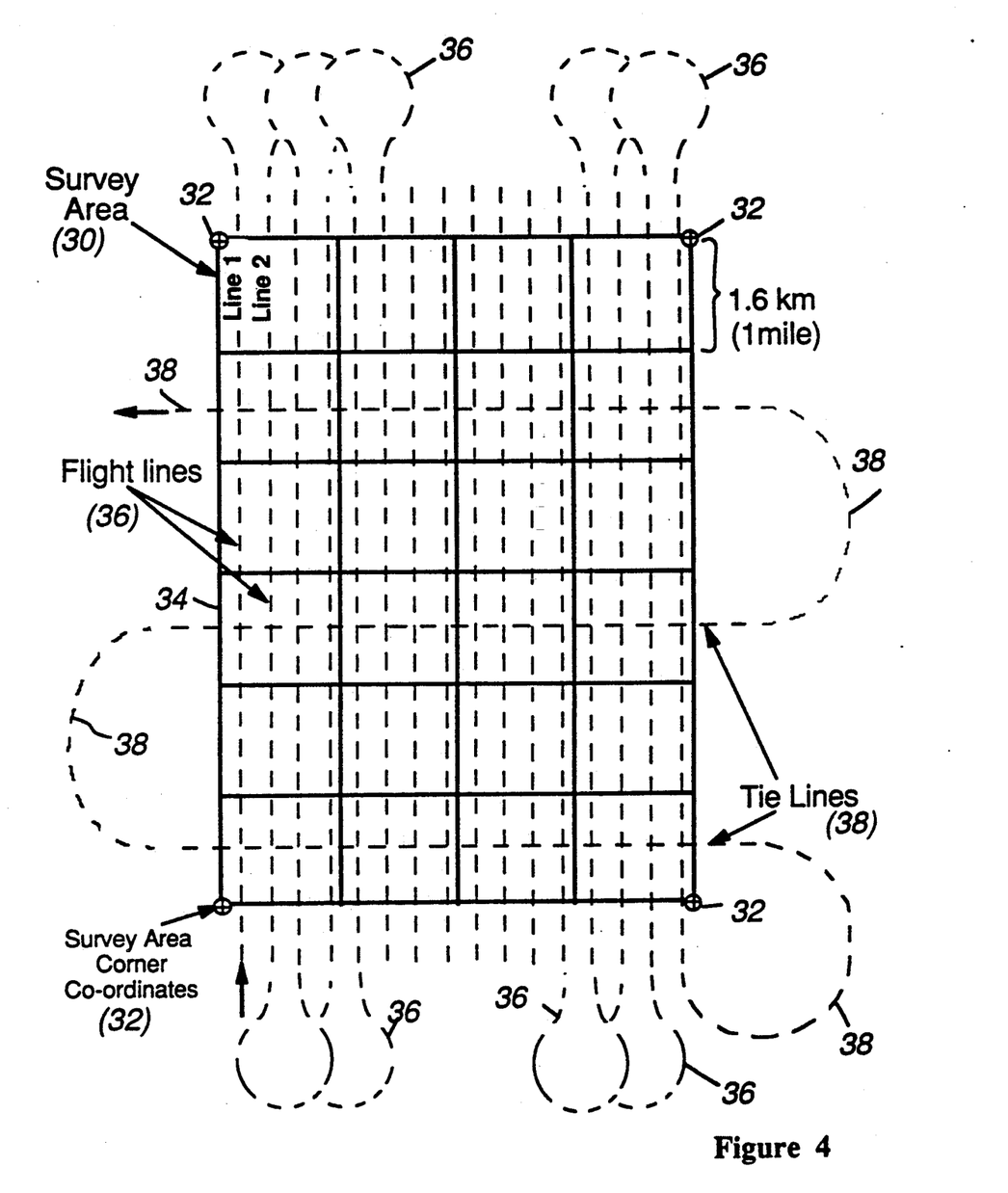
FIG. 4 is a diagrammatic representation of a typical survey area.

Referring next to FIG. 4, the survey area 30 is typically defined by four corner co-ordinates 32 and divided into a grid 34. The grid 34 defines flight lines 36 flown by the aeroplane 28 when gathering the data. To check the flight lines 36 being flown by the aeroplane 28, the grid 34 can include tie-lines 38.

A base station and local ground stations (not shown) can be set up near or in the survey area 30. The function of the local ground stations (not shown) is to monitor fluctuations in the level of gamma ray activity and other data variations over the period of the surveying the area 30. As is known, rapidly changing fluctuations in gamma ray levels are principally the result of meteorological and other environmental effects. In addition, variations in the navigational positioning data may result in erroneous position fixes and require post-processing calibration and correction of the data gathered by the apparatus 10, which is best done at the final processing and interpreting facilities (not shown).

The base station (not shown) is similar to the local ground stations except that it includes more sophisticated equipment. The purpose of the base station is to provide a quality-control check of the raw data in the field. To this end, there is usually a computer system to audit, analyze and perform the quality control check in the field. Any data which do not meet specification are then collected again. Once the integrity of the collected data is established, the data are forwarded to final processing and interpretation facilities (not shown). At the final processing facilities, the data are processed and interpreted as will be discussed below.

Referring back to FIG. 1, in the preferred embodiment, the gamma ray spectrometer 16 comprises a multi-channel gamma ray spectrometer having 256 discrete channels. The 256 channels are distributed across an energy spectrum from 0.5 MeV to 3.0 MeV. In known manner, these channels can be combined through electronic or digital methods into various regions-of-interest comprising more than one channel. In the present invention, there are three energy regions or "windows" which are of particular interest. The first window has its centre on 1.46 MeV and corresponds to the gamma radiation indicative of potassium ($^{40}$K). The second window has its centre on 1.76 MeV and corresponds to the gamma radiation indicative of bismuth ($^{214}$Bi) As a daughter product, bismuth is indicative of the equivalent uranium present in the survey region. The third window has its centre on 2.62 MeV and corresponds to the gamma radiation indicative of thallium ($^{208}$Tl), which is indicative of the equivalent thorium present in the survey region.

The spectrometer 16 connects, in known manner, to the detectors 17. The detectors 17 comprise an array of scintillation detectors made of sodium iodide doped with thallium, with each detector typically being 4.19 liters and the array typically totalling 67 liters. The orientation of the crystal detectors is 80% directed downwards, and 20% directed upwards. The 20% which are directed upwards are shielded on their lower surface and their function is to measure the atmospheric or background component of gamma radiation. In some instances, it may prove advantageous to configure all detectors 17 downwards to enhance the measurement of radioelement signals which emanate from the earth.

Figure 5:
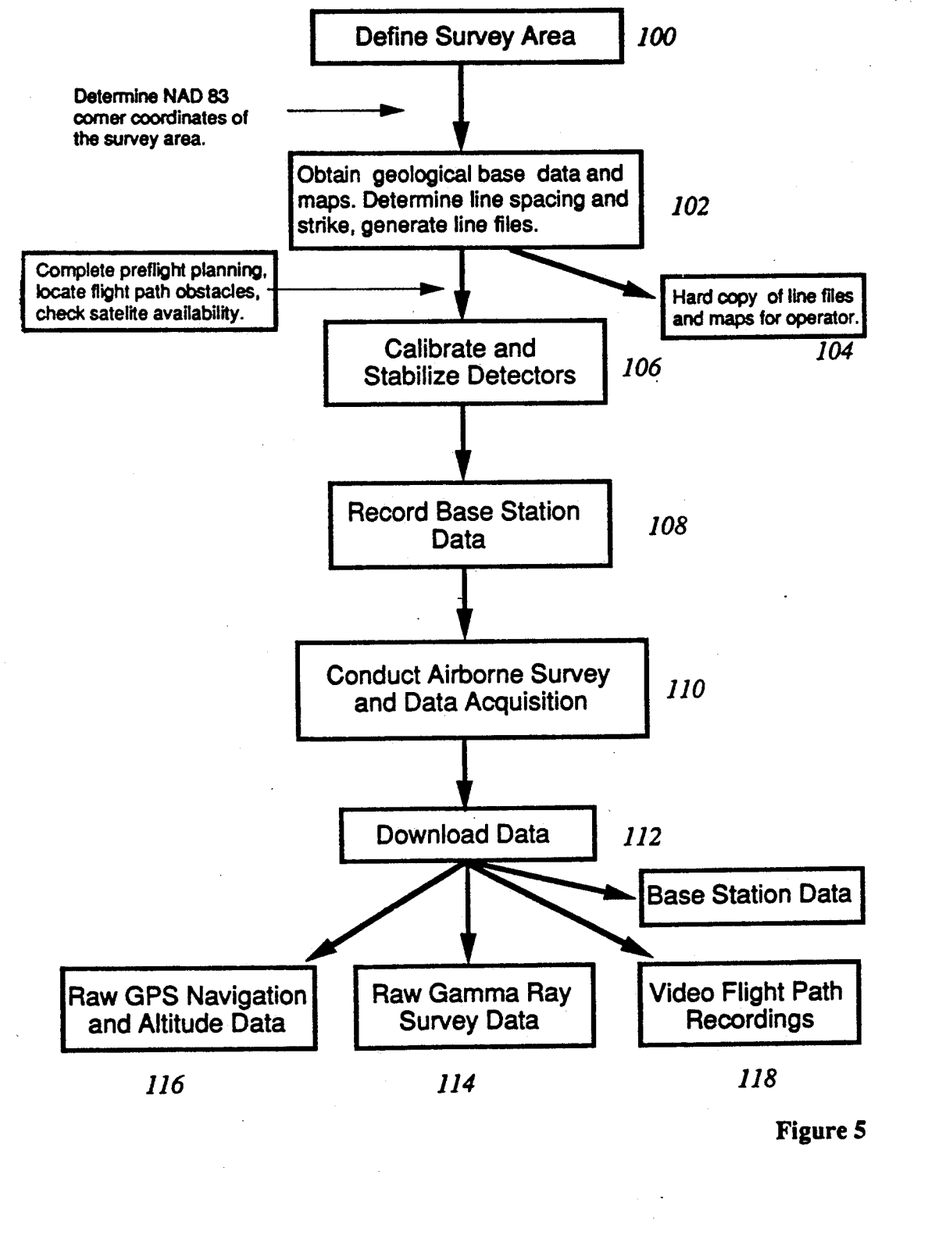
FIG. 5 shows in flow chart form the steps comprising the method for gathering data for identifying sub-terranean deposits according to the present invention.

Reference is next made to FIG. 5 which shows the steps involved in gathering gamma ray data according to the present invention. The first step indicated by reference 100 involves defining the survey area 30. The survey area 30 is defined by the corner co-ordinates 32 (FIG. 4). Defining the survey area 30 includes setting the grid 34 by determining the spacing and direction of the flight lines 36 and the tie lines 38 in block 102, in addition to, the flying height and speed of the aeroplane 28, and the sampling rate of the data acquisition computer 12.

Pre-survey preparation also includes obtaining and correlating geological base data and maps pertaining to the survey area 30 (block 102). The geological base data can include all known aggregate deposits, surficial geological information related to aggregates, such as aerial photographs, satellite images, regional soils composition information, and any other relevant sub-surface information, such as water well and stratigraphic logs. As will be appreciated, such information aids in correlating the survey data to known aggregate-related features. To aid the pilot and assistant in conducting the survey, hard copies of the flight lines 36 and a map of the survey area 30 can be generated in block 104.

The next step in conducting a survey involves calibrating and stabilizing the detectors 17 (block 106) and starting the stationary data recording at the base station (block 108).

The next step indicated by block 110 involves conducting an airborne survey to gather gamma ray data and other data (e.g. barometric pressure and temperature) from the survey area 30 using the acquisition apparatus 10. The survey is conducted by flying the aeroplane 28 equipped with the acquisition apparatus 10 over the survey area 30 following the flight lines 36 in the grid 34. The gamma ray spectrometer 16 collects radioelement data at an accumulation rate of 1 second per measurement period. Procedures for conducting gamma ray surveys, including data acquisition, processing and mapping, are well documented. A complete manual describing the equipment and methodology of data acquisition and processing is published by the International Atomic Energy Agency and entitled *Airborne Gamma Ray Spectrometer Surveying*, Technical Report No. 323.

Due to the random nature of gamma ray production, there are statistical uncertainties inherent in the radioelement measurements obtained in step 110. Gamma ray surveys involve the statistics of rare events to which the Poisson distribution applies. To acquire data of adequate quality, two measures are taken in the preferred embodiment. First, the acquisition equipment 10 utilizes sufficiently large volumes of scintillation detectors 17 to reduce measurement uncertainty to acceptable limits, as is known in the art. Secondly, data processing techniques such as digital filtering can be used to reduce measurement uncertainty.

It has also been found that the soil composition in the survey area 30 can cause variations in the radioelement population data. The soil texture is the most significant factor affecting the composition of the various radioelement populations. Superimposed on the multivariate nature of the data are such influences as soil moisture content, atmospheric radon gas and its related daughter products, recent precipitation and standing water. Such factors can result in apparent radioelement variations in the area of 30%. However, it has also been found that, with minimal effect from the above influences for small area surveys, e.g. a few square kilometers, the gamma ray data are essentially normally distributed within an area of relatively homogeneous soil texture, with some occasional high or low biases. On the other hand in large area surveys, which are the most common for reconnaissance work, the data are not generally normally distributed and there may be many populations present for the three energy windows of interest.

The raw data gathered during the airborne survey is downloaded from the data acquisition computer 12 for further processing and correlation (block 112). The raw data includes gamma ray data (block 114) gathered by the gamma ray spectrometer 16 and detectors 17, navigation and altitude data (block 116) collected by the navigation receiver 20, video flight path data (block 118) recorded by the video camera 18 and video recorder 19, pressure and temperature data.

Figure 6:
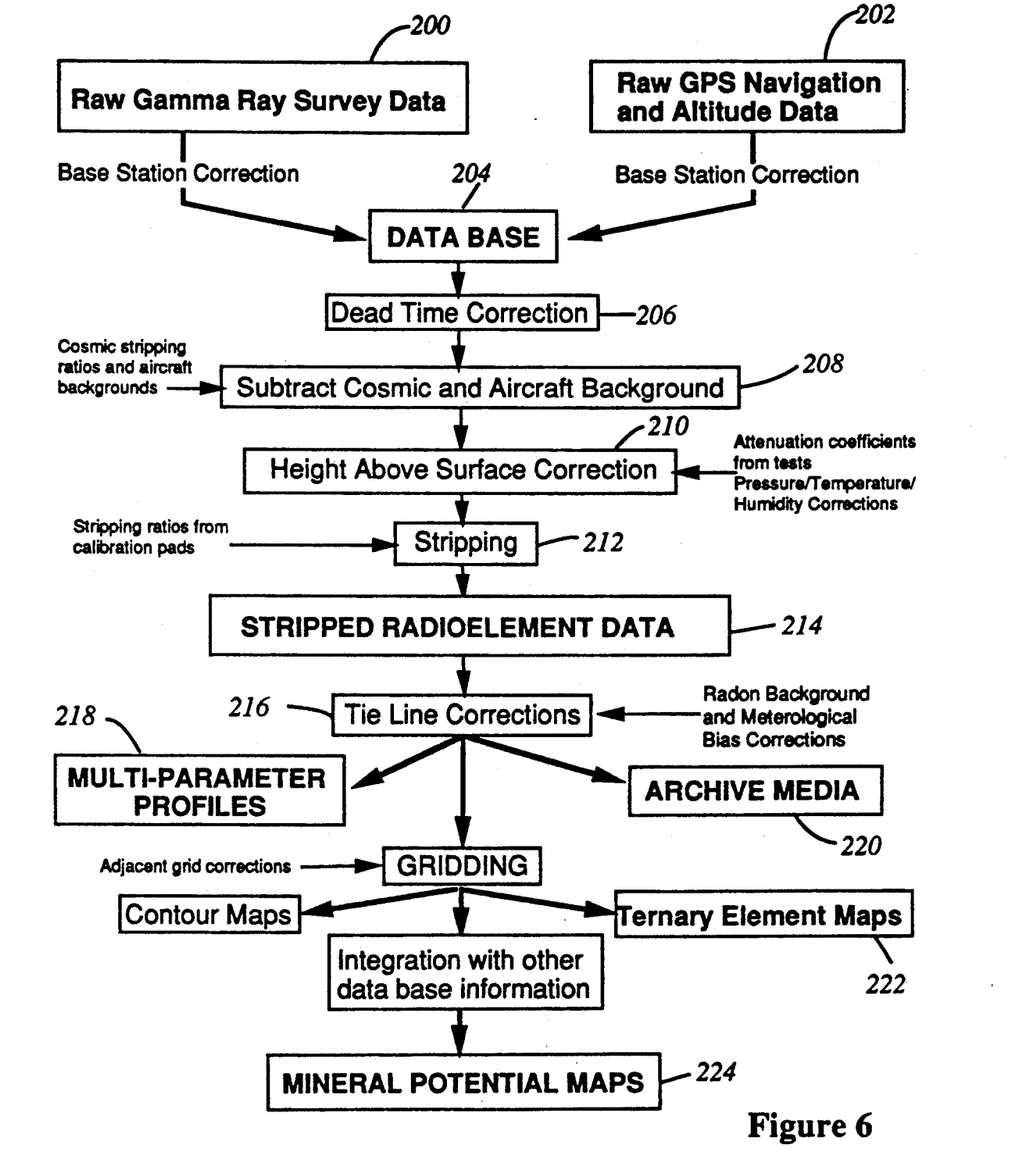
FIG. 6 shows in flow chart form the steps comprising the method for processing the data gathered from the survey area.

Reference is next made to FIG. 6 which shows the steps for processing the raw data to derive radioelement signatures indicative of aggregate deposits. The raw gamma ray data are correlated with readings obtained at the base station and corrected if necessary (block 200). Similarly, the raw navigation, altitude, and other data collected are compared with readings from the base station and if necessary, adjusted (block 202). The correlated gamma ray data, navigation data, and other data are then compiled in a data base (block 204).

The data base is further corrected for other known effects which should be taken into account. The data is corrected for dead time data acquisition (block 206), for Compton effects and aeroplane background (block 208), and in block 210, for temperature, barometric pressure, altitude, radon background. As is evident to one skilled in the art, such effects can be corrected using known techniques. The collected data may be further enhanced using other known methods such as digital signal processing including filtering, smoothing, factor analysis and cluster analysis. In blocks 210 and 212, the gamma ray data is "stripped" using methods known to one skilled in radiometric techniques including spectral stripping and the use of stripping ratios derived from calibration pads. The data can be further corrected by incorporating any data variations according to the tie-lines 38 in block 216.

Figure 7A:
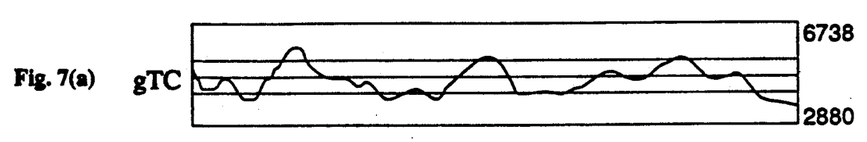
Figure 7B:
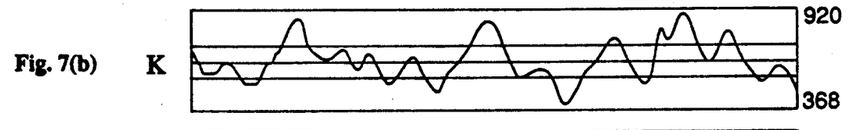
Figure 7C:
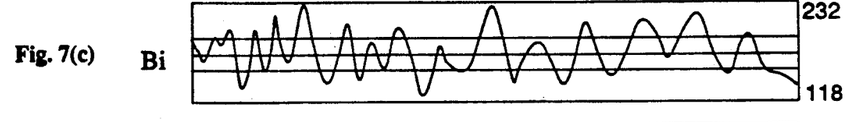
Figure 7D:
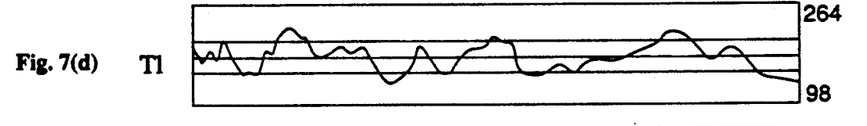
Figure 7E:
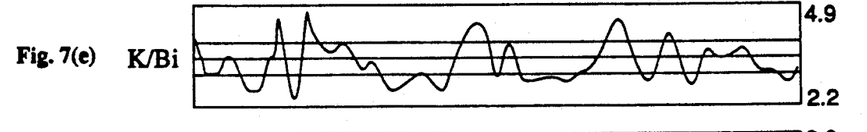
Figure 7F:
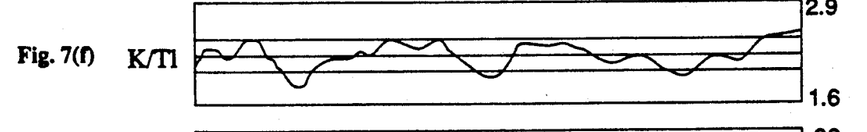
Figure 7G:
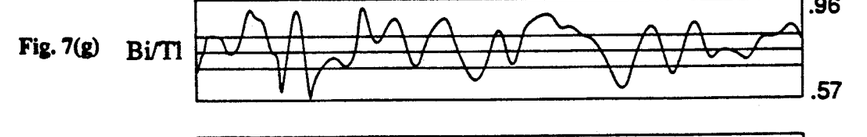
Figure 7H:
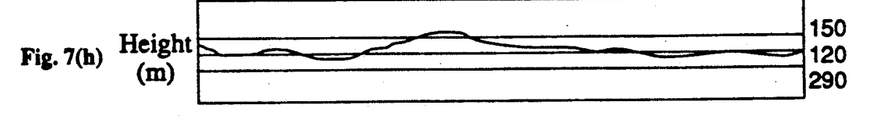
Figure 7I:
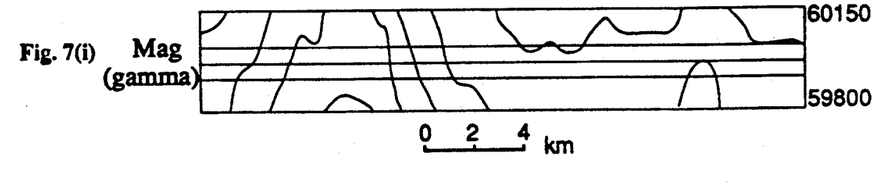

Once the data have been processed, the remaining steps involve presenting the data in a meaningful way. There are various known methods for mapping and displaying gamma ray data. For example, gamma ray data can be presented: (1) in profile format with multiparameter, plots in a true linear scale as shown in FIG. 7(e) (block 220); (2) in profile map format in which the data are plotted as profiles along the horizontal axis formed by each data acquisition line; (3) as gridded contour maps (block 300) in which the gridding algorithm takes the average of all data points lying within a geometric area and weighted for distance and orientation from the grid point; or (4) in a colour ternary map, in which each of the three radioelements is represented by one of the primary colours, with the colour intensity varying according to the radioelement concentration (block 222). The processed gamma ray data can also be compiled into mineral potential maps in block 224 as will be discussed further.

The complicated nature and structure of the radioelement data can make determining quantitatively significant anomalous values difficult. Moreover, the large proportion of data which appears anomalous when the data are analyzed as one population, makes recognizing valid anomalies related to aggregates complex. Accordingly, in the preferred embodiment of the present invention, an overview gridded contour map 300 (shown in FIG. 8) is first compiled using data from the equivalent thorium window.

Figure 8:
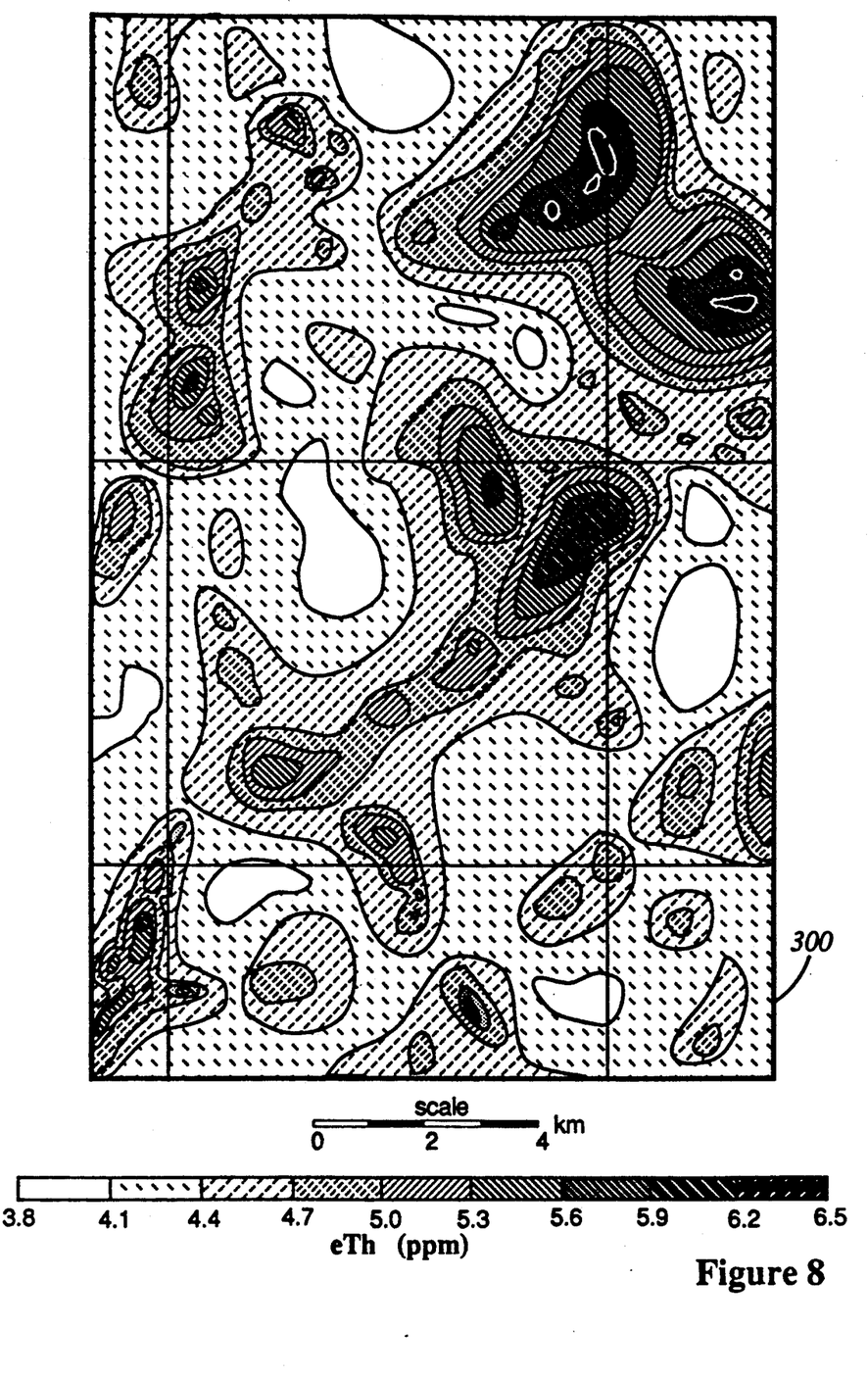
FIG. 8 shows a typical elemental contour map for equivalent thorium compiled according to the present invention.

The purpose of the equivalent thorium contour map 300 in FIG. 8 is to determine if the soil texture in the survey area 30 is relatively homogenous. If the soil is relatively homogenous, then the radioelement data for the three windows can be expected to be approximately normally distributed. Conversely, if there are more than one soil type in the survey area 30, these regions can be isolated and viewed as distinct data sub-sets. Each major soil type region is then analyzed as a separate sub-set of the data.

The overview contour map 300 in FIG. 8 uses data from the equivalent thorium window because it generally most closely represents the soil texture variations, i.e. soil type. In addition, the equivalent thorium radioelement has relatively low mobility in soil water and is not greatly affected by meteorological conditions.

In the preferred embodiment, the overview contour map 300 is created using the standard deviations from the mean value of the equivalent thorium ground concentrations, which are calculated as if the data set was normally distributed and conformed to the central limits theory in statistics.

Once the data have been segregated according to the soil type regions in the survey area, the radioelement ground concentrations as indicated by the three primary energy windows, i.e. corresponding to potassium, equivalent thorium and equivalent uranium, are contoured and presented on contour maps similar to map 300 according to block 223 in FIG. 6. The contour intervals on the map are determined using the known histogram equalization method by Gonzalez and Wintz, 1977 and also by Hall, 1979. The histogram equalization method of quantizing the data in the three energy windows ensures a uniform distribution of levels which tends to enhance low-contrast information. As can be appreciated, the number of quantization levels is determined by the resolution of the image generating equipment.

Figure 9:
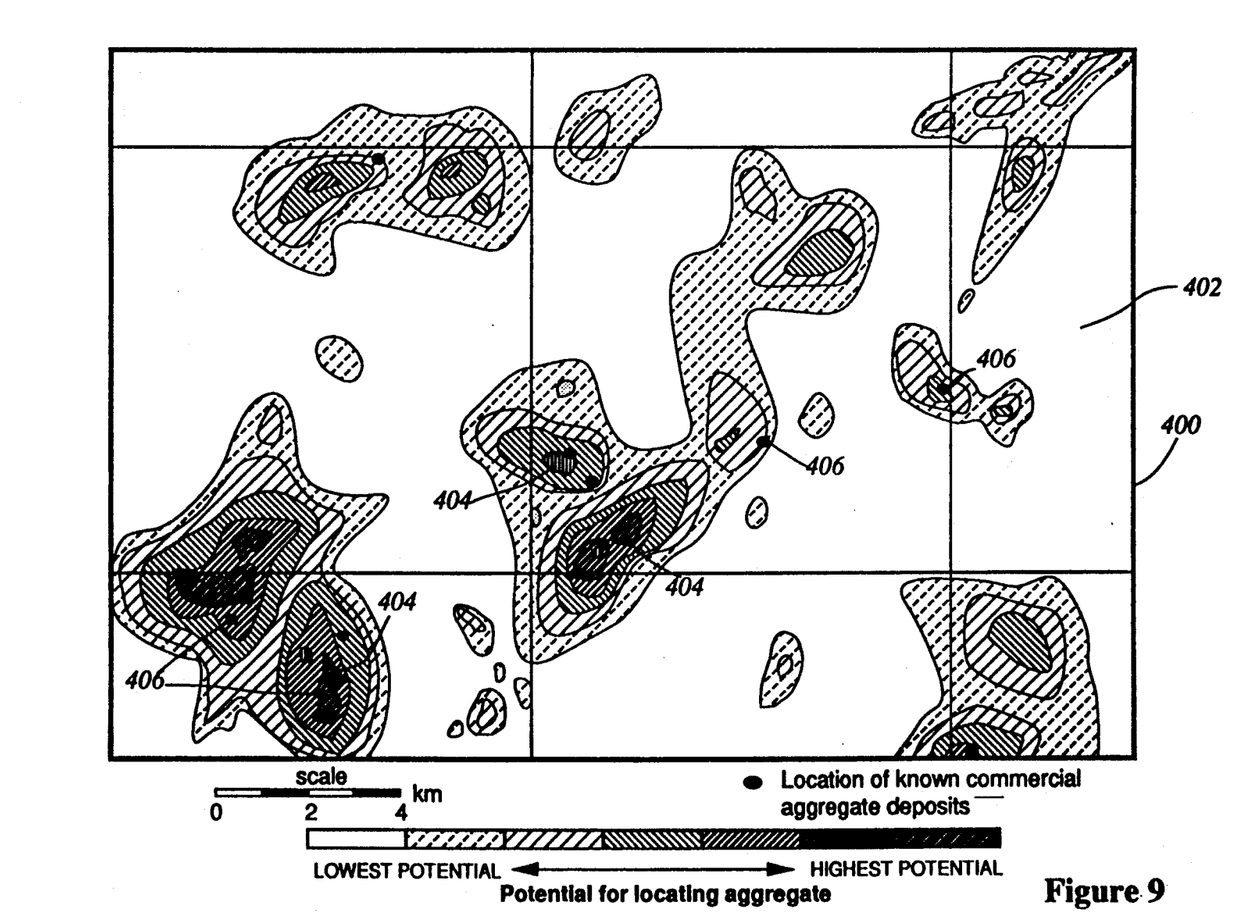
FIG. 9 shows a typical aggregate potential map compiled and correlated according to the present invention.

Reference is made to FIG. 9 which shows a mineral potential map 400 generated according to the present invention. The potential or probability of the presence of aggregate deposits is presented as shaded (or coloured) areas which are overlaid on a map of the survey area 30. The potential or probability is derived from the relative concentrations of the radioelements according to the signature for aggregate deposits.

The mineral potential map 400 provides an approximation of the aggregate potential for the survey area 30. The map 400 shows the locations within the survey area 30 which have the highest probability for containing aggregate deposits. For the reasons discussed above, a potential map 400 is prepared for each homogenous soil type region in the survey region.

The values for the data points for the mineral potential map 400 are compiled by summing the normalized and gridded data from the equivalent thorium window and from the potassium window. This set of data points provides a first approximation of the unique signature most commonly associated with a surface or sub-terranean aggregate deposit. For such an aggregate deposit, the primary indicator or signature, comprises a coincident low value of the radioelement ground concentrations of equivalent thorium and of potassium, relative to their radioelement ground concentrations adjacent to the anomalous region.

As discussed above, the signature is evident in a normalized data set which is derived by summing scaled potassium and equivalent thorium values. The total radioactivity value at a grid cell is the sum of the scaled radioelement concentrations, which are derived as follows:

$$SUM = K + Th/4$$

Where:
SUM—value of the scaled radioelement concentrations at a grid cell
K—potassium concentration in percent at a grid cell
Th—equivalent thorium concentration in ppm at a grid cell The low value of the combined radioelement ground concentrations which is associated with aggregates should be lower by 15% to 20% than the combined radioelement ground concentrations adjacent to the anomalous area. However, it has been found that the amplitude of the signature will vary somewhat over a range of different areas surveyed. This variation relates to the underlying geology, soil types and composition of the aggregate materials.

The first approximation of the potential map 400 for aggregate deposits, is calculated by selecting the data which have values in the lowest 15% to 20% of the combined data set for the survey area 30. The selected data are then contoured, using the above histogram equalization method to determine the contour interval, with the lowest combined radioelement values equalling the highest probability of discovering aggregates. The contour map is then generated using the selected data with the gridded, graded scale representing six (more or less) contour intervals from the highest to lowest priority of discovering aggregates. Locations on the aggregate potential map 400 where the value of the combined data is greater than the lowest 15% to 20% range is unshaded 402, and locations showing the highest probability for aggregate deposits are darkly shaded 404.

The first approximation for the potential map 400 can be improved in areas where some ground control knowledge exists. By correlating the ground control knowledge with the aggregate gamma ray data, the potential aggregate deposits can be better identified and delineated. The ground control information can include known aggregate deposits 406 in FIG. 9, aggregate indications from water wells or other sub-surface aggregate confirmation, as well as locations where aggregates are known not to exist.

Moreover, in areas where known aggregate deposits exist, the first approximation of the potential map 400 can be tested and refined by using multiple linear regression and correlation analyses. These techniques test the response over known aggregate deposits and develop an algorithm to look for similar signatures in areas of the region where there is no knowledge of aggregate deposits. The algorithm can be expressed as follows:

$$P(a) = K_1(Th_m - Th) + K_3(K_m - K) + K_3(K_m/Th_m - K/Th)$$

Where:
P(a)—probability of locating aggregates
$K_1$—constant
$Th_m$—mean value for equivalent thorium for region
Th—value of equivalent thorium
$K_2$—constant
$K_m$—mean value for potassium for region
K—value of potassium
$K_3$—constant The resulting aggregate potential map, generated in a manner described above, (not shown) represents a second approximation of the potential for locating aggregate deposits in the survey area.

A third approximation of the aggregate potential map (not shown) can be achieved by using more refined techniques which have been developed. For example there are algorithms for correlating maps of radioelement concentrations, using Bayesian statistics for the mathematical modelling of geochemical signatures with the various other base data; refer to Bonham Carter, Agterberg and Wright, Integration of Geological Data Sets for Gold Exploration in Nova Scotia, Photogrammetric Engineering and Remote Sensing, November, 1988. By using information including well logs and surface soil maps, an a priori binary map is produced which weights known occurrences and non-occurrences of aggregates. Multiple linear regression of the a priori aggregate map on the radioelement concentration maps then gives regression co-efficients which are used to create a map showing a posteriori probabilities of aggregates occurrences.

In another embodiment of the present invention, the method discussed above can be used to locate clay-rich soils. The method is similar to that used for identifying and locating aggregate deposits in FIGS. 5 and 6.

Clay-rich deposits have a distinctive signature consisting of the following:
(1) a low level (under 2 ppm) but at least 25% higher than the area mean measurement of equivalent uranium;
(2) a measurement at least 25% higher than the area mean value for potassium;
(3) a measurement at least 25% higher than the area mean value for equivalent thorium.

Lastly, the following is a summary of three surveys which were conducted according to the method discussed above. The data were processed, mapped and interpreted according to the present invention, and locations were identified as having a high potential of containing aggregates. Verification tests were undertaken to determine the predictive accuracy of the aggregate potential map 400, using known aggregate deposits, subsurface geological control, local knowledge and on-site field investigations.

Predictive successes are areas that were found to contain a substantial amount of aggregates, however, not all may prove to be commercially viable deposits. As experience has determined that of the known predictive successes, generally 50% are presently or potentially commercial deposits, then an overall success rate of 33% was achieved. Predictive failures are areas that contain little or no aggregates. Unknowns are areas that could possibly contain aggregates but further investigation is required, e.g. the deposit may be deeply buried or of poor quality. When unknown areas are investigated, the overall success rate of 33% will likely increase. Areas that contained bedrock outcrops, wetlands and build-up areas were not included in the statistical analysis.

EXPERIMENT NO. 1

The first experiment involved an airborne survey over an area of approximately 595 sq km near the city limits of Calgary. According to the geological history of this area, the deposits are of both pre-glacial and glacial origin. The pre-glacial deposits are generally thicker and of better quality than those of glacial origin. However, the pre-glacial deposits are often deeply buried by glacial till. The majority of the sites visited contained gravel of a glacial origin.

The area was flown at a height of 120 m, at a speed of approximately 275 kmph and at a line spacing of 400 m. The acquisition apparatus 10 used an array of sodium iodide crystal detectors 17 having a volume of approximately 67 liters. All of these detectors 17 were directed downwards.

The results of the verification analysis of the airborne survey conducted over the area near Calgary can be summarized as follows.

| Predictive Successes | 21 | 68% |
|---|---|---|
| Predictive Failures | 1 | 3% |
| Unknown | 9 | 29% |

EXPERIMENT NO. 2

A second airborne survey was conducted on an area of approximately 830 sq km near the town of Hardy in southern Saskatchewan. According to the geological history of this area, the sand and gravel deposits are generally of glacial origin, with some of the cleanest deposits being found in geological formations known as eskers.

In the second survey, the area was also flown at a height of 120 m, at a speed of approximately 225 kmph and at a line spacing of 800 m. The GRS equipment consisted of an array of sodium iodide crystal detectors with a volume of approximately 67 liters. In this experiment, seventy-five percent of the detector volume was directed downwards and the remaining twenty-five percent was directed upwards to monitor atmospheric gamma ray fluctuations.

The results of the verification analysis of the second survey can be summarized as follows.

| Predictive Successes | 23 | 70% |
|---|---|---|
| Predictive Failures | 4 | 12% |
| Unknown | 6 | 18% |

The results of the survey in Saskatchewan were verified with a drilling program. The drilling program was undertaken after the initial on-site reconnaissance work using a known EM31 conductivity meter and published water well data.

EXPERIMENT NO. 3

In the third experiment, an airborne survey was conducted over an area of approximately 260 sq km near the south-central Ontario town of Paris. According to the geological history of this area, the sand and gravel deposits are generally of a glacial origin, with the majority of the deposits being found in glacio-fluvial meltwater channels.

The area near Paris was flown at a height of 120 m, at a speed of approximately 275 kmph and at a line spacing of 400 m. The GRS equipment consisted of an array of sodium iodide crystal detectors with a volume of approximately 67 liters. In the third experiment, all of the detectors were directed downwards.

The results of the verification analysis of the third experiment are summarized as follows.

| Predictive Successes | 26 | 68% |
|---|---|---|
| Predictive Failures | 3 | 8% |
| Unknown | 9 | 24% |

In Ontario, no direct on-site field truthing of the results obtained from the survey was undertaken. However, based on published information on aggregate deposits, the results of the survey in Ontario are within the same range as the results of the other two experiments.

It will be evident to those skilled in the art that other embodiments of the invention fall within its spirit and scope as defined by the following claims.

I claim:

1. A method for locating a surface or sub terranean deposit of geological aggregate matter, the method comprising the steps of
   (a) traversing an area of the earth's surface;
   (b) obtaining measurements of gamma radiation from natural radioelements corresponding to the concentration of uranium at spaced points along the traverse;
   (c) obtaining measurements of gamma radiation from natural radioelements corresponding to the concentration of potassium at spaced points along the traverse;
   (d) obtaining measurements of gamma radiation from natural radioelements corresponding to the concentration of thorium at spaced points along the traverse;
   (e) determining individual area mean values for the natural gamma radiation measurements obtained for the area traversed for each of uranium, potassium, and thorium; and
   (f) identifying any locations int he area traversed in which the measurements of natural gamma radiation corresponding to uranium are approximately equal to the area mean value determined for uranium, the measurements of natural gamma radiation corresponding to potassium are low relative to the area mean value determined for potassium, and the measurements of natural gamma radiation corresponding to thorium are low relative to the area mean value determined for equivalent thorium.

2. A method as recited in claim 1, wherein the measurements of gamma radiation corresponding to uranium are within 10% of the area mean value determined for uranium, and the measurements of natural gamma radiation corresponding to potassium are below 90% of the area mean value determined for potassium, and the measurements of natural gamma radiation corresponding to thorium are below 90% of the area mean value determined for thorium.

3. A method as recited in claim 1 or 2, further comprising the step of plotting the points corresponding to the locations noted on a scale map of the area traversed, to create a map delineating the surface boundaries of the surface or sub-terranean geological aggregate deposit.

4. A method for locating surface and subterranean clays deposits, the method comprising the steps of:
   (a) traversing an area of the earth's surface;
   (b) obtaining measurements of gamma radiation from natural radioelements corresponding to the concentration of uranium at spaced points along the traverse;
   (c) obtaining measurements of gamma radiation from natural radioelements corresponding toe concentration of potassium at spaced points along the traverse;
   (d) obtaining measurements of gamma radiation from natural radioelements corresponding to the concentration of thorium at spaced points along the traverse;
   (e) determining individual area mean values for the natural gamma radiation measurements obtained for the area traversed for each of uranium, potassium, and thorium; and
   (f) identifying any locations in the area traversed in which the measurements of natural gamma radiation corresponding to uranium are high relative to the area mean value determined for uranium, the measurements of natural gamma radiation corresponding to potassium are high relative to the area mean value determined for potassium, and the measurements of natural gamma radiation corresponding to thorium are high relative to the area mean value determined for thorium.

5. A method as recited in claim 4, wherein the measurements of natural gamma radiation corresponding to uranium are above 125% of the area mean value determined for uranium, and the measurements of natural gamma radiation corresponding to potassium are above 125% of the area mean value determined for potassium, and the measurements of natural gamma radiation corresponding to thorium are above 125% of the area mean value determined for thorium.

6. A method as recited in claim 4 or 5, further comprising the step of plotting the points corresponding to the locations noted on a scale map of the area traversed, to create a map delineating the surface boundaries of the surface or sub-terranean geological clay deposit.

* * * * *

UNITED STATES PATENT AND TRADEMARK OFFICE
CERTIFICATE OF CORRECTION

PATENT NO. :   5,214,281
DATED      :   May 25, 1993
INVENTOR(S):   Douglas J. Rowe It is certified that error appears in the above-identified patent and that said Letters Patent is hereby corrected as shown below:

Col. 12, claim 1, line 35; after "the steps of" insert -- : --.

Col. 12, claim 1, line 53; change "int he" to -- in the --.

Col. 13, claim 4, line 18; change "toe" to -- to the --.

Signed and Sealed this

Twenty-second Day of March, 1994

Attest:

BRUCE LEHMAN

Attesting Officer    Commissioner of Patents and Trademarks